L. W. GRAY & G. H. KNOWLES.
COUPLING FOR WAGONS.
APPLICATION FILED OCT. 25, 1912.
1,103,042.
Patented July 14, 1914.
2 SHEETS—SHEET 1.
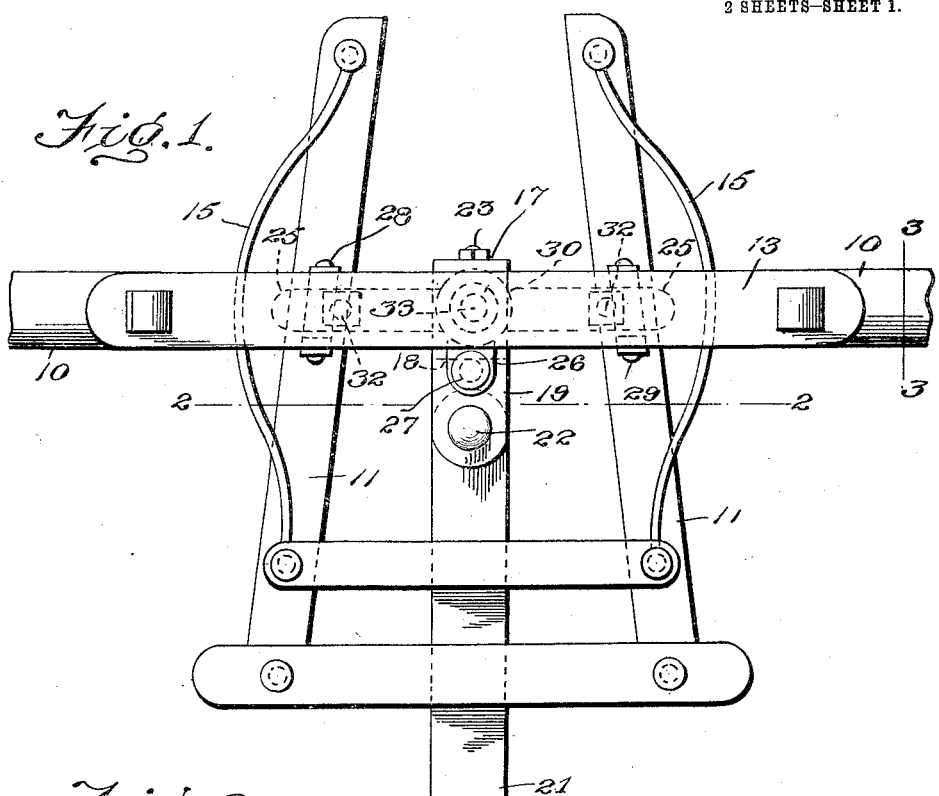
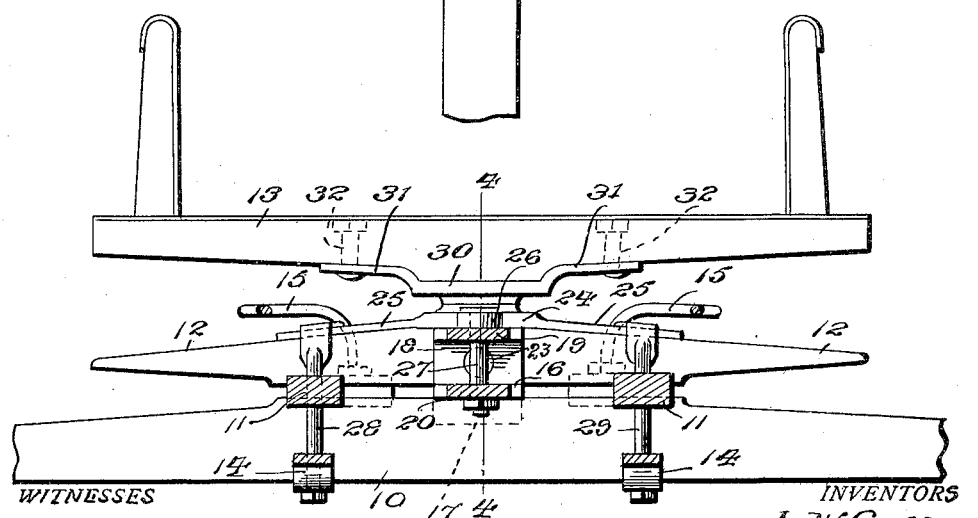
WITNESSES
INVENTORS
L. W. Gray.
G. H. Knowles
By
Attorneys.

L. W. GRAY & G. H. KNOWLES.
COUPLING FOR WAGONS.
APPLICATION FILED OCT. 25, 1912.
1,103,042.
Patented July 14, 1914.
2 SHEETS—SHEET 2.
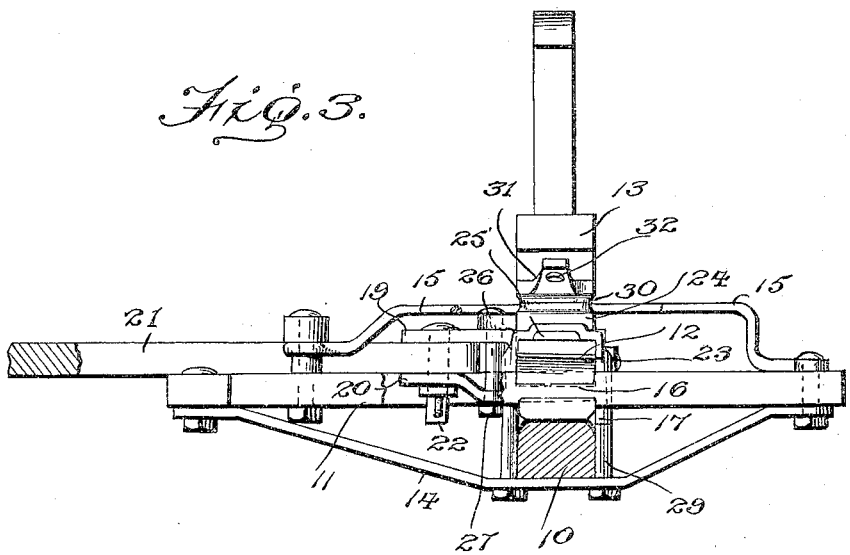
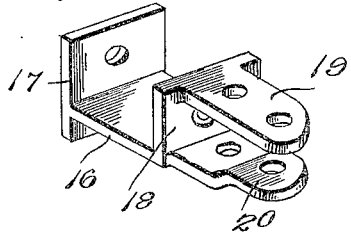
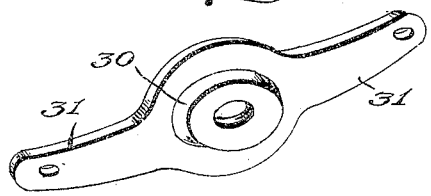
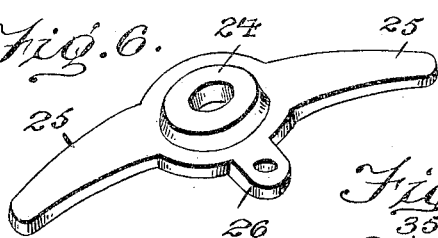
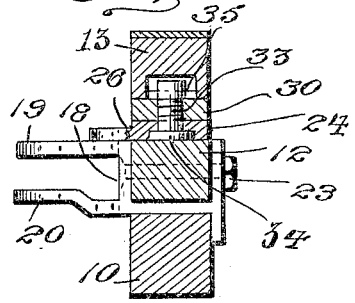
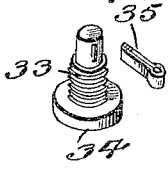
WITNESSES
INVENTORS
L. W. Gray.
G. H. Knowles
By
Attorneys.
THE NORRIS PETERS CO., PHOTO-LITHO., WASHINGTON, D. C.

UNITED STATES PATENT OFFICE.

LEONIDAS W. GRAY AND GEORGE H. KNOWLES, OF RUSHVILLE, ILLINOIS.

COUPLING FOR WAGONS.

1,103,042.  Specification of Letters Patent.  Patented July 14, 1914.

Application filed October 25, 1912. Serial No. 727,792.

*To all whom it may concern:*

Be it known that we, LEONIDAS W. GRAY and GEORGE H. KNOWLES, citizens of the United States, residing at Rushville, in the county of Schuyler and State of Illinois, have invented certain new and useful Improvements in Couplings for Wagons, of which the following is a specification.

This invention relates to improvements in wagons, more particularly to the heavier class of wagons employed for farm work and wagons employed for hauling heavy loads, and has for one of its objects to increase the efficiency and utility of devices of this character, and to avoid weakening the forward axle and other parts by perforations for the swivel or "king-bolt members."

Another object of the invention is to provide an improved coupling mechanism for the front axle which firmly unites the parts without weakening them.

Another object of the invention is to produce a device of this character whereby a broken reach may be replaced without removing the load or the bed from the running gear.

Another object of the invention is to provide a simply constructed coupling device between the forward axle, the forward hounds, sand board, and the front body bolster, whereby broken or impaired parts may be readily renewed without discarding the remaining portions of the vehicle.

With these and other objects in view, the invention consists in certain novel features of construction as hereinafter shown and described and then specifically pointed out in the claims, and in the drawings illustrating the preferred embodiment of the invention.

Figure 1 is a plan view of a portion of the forward running gear constructed in accordance with the invention; Fig. 2 is a rear elevation with the hounds and reach in section on the line 2—2 of Fig. 1; Fig. 3 is a side elevation of the parts shown in Fig. 1 with the axle in section on the line 3—3 of Fig. 1; Fig. 4 is a transverse section on the line 4—4 of Fig. 2; Fig. 5 is a detached perspective view of the sandboard and axle bearing plate; Fig. 6 is a perspective view from above of the swivel plate of the sandboard; Fig. 7 is a perspective view from beneath of the swivel plate of the forward bolster; Fig. 8 is a detached perspective view of the king bolt.

Corresponding and like parts are referred to in the following description and indicated in all of the views of the drawings by the same reference characters.

The improved device is applied to the forward axle, the forward hounds, the forward sand-board, and the forward bolster, and in the drawings the improved device is applied to these parts. A portion of the forward axle is represented conventionally at 10, the forward hounds, including the side members, at 11, the forward sand-board at 12, and the forward body bolster at 13, these parts being of the usual form.

In the improved construction, the axle and sand-board are not perforated to receive the swivel devices, thus retaining the full strength of these parts, and the principal object of the present invention is to thus couple the swivel members without perforating or otherwise weakening the axle or the sand-board.

The axle 10 and the sand-board 12 are recessed slightly in the ordinary manner to receive the side members 11 of the hounds, as shown. The hounds and axle are supported by the usual braces 14 applied to their lower faces, and likewise provided with the usual sand-board guards 15 applied to their upper faces. The axle 10 is likewise slightly recessed centrally thereof, while the lower face of the sand-board 12 is correspondingly slightly recessed, and located within these confronting recesses is a bearing member 16 having a T-head 17 at the forward end to bear respectively against the forward faces of the axle and sand-board. At its rear end the plate 16 is provided with an upwardly directed web 18 which bears against the rear face of the sand-board. Extending rearwardly of the web 18 are horizontal projections 19—20 between which the reach, a portion of which is represented at 21, is pivotally supported by a pin 22. A binding bolt 23 extends through the upper portion of the T-head and likewise through the web 18 and the sand-board 12, thus binding the member 16 to the sand-board.

Bearing upon the sandboard is a swivel plate 24 having oppositely directed extensions 25 reduced in width and extending beyond the side members 11 of the hounds, as shown. The plate 24 is likewise provided with a rearwardly directed perforated ear or lug 26, the perforation of the lug registering with corresponding perforations through the projections 19 and 20, so that a binding bolt 27 may be employed to unite the plate 24 to the member 16 and its projections. Relatively long U-bolts 28—29 are passed through suitable apertures in the hound members 11 and the braces 14, and widened at their upper parts and bearing over the terminals of the extensions 25. The U-bolts thus serve as clip devices to firmly unite the braces 14, axle 10, hound members 11, sand-board 12, and plate 24 with its extensions 25, and without perforating the axle.

Bearing against the bolster 13 is a swivel plate 30 having reduced extensions 31 which are secured at their terminals by bolts or other suitable fastening devices 32 to the bolster. A relatively large pivot pin or king bolt 33 extends through the plates 24 and 30 and is enlarged at its lower end, as shown at 34, and fits in a recess or counterbore in the lower face of the plate 24, so that no part of the king bolt projects below the plate 24. By this arrangement it will be noted that the lower face of the enlargement 34 rests upon the upper face of the sand-board.

The king bolt is threaded into the member 30, where it passes through the latter and extends above the member 30, and the extended portion received in a recess in the lower face of the bolster and is perforated to receive a spring key or other suitable fastening device 35. By this means, the plates 24 and 30 are rotatably coupled, and the king bolt effectually locked from retrograde movement. It will thus be obvious that a simply constructed coupling device is produced, whereby the various parts of the forward running gear are firmly coupled and are free to oscillate in the ordinary manner, and without weakening the axle.

Having thus described our invention, what we claim and desire to secure by Letters Patent is:

1. In a device of the class described, a bearing member adapted to be disposed between the axle and sand-board of a vehicle, vertical webs extending from said member and adapted to engage against the axle and sand-board, fastening devices adapted to connect said webs to the sand-board, another bearing member adapted to engage the sand-board, means for connecting said bearing members, and means adapted to couple said last-mentioned bearing member to the running gear of a vehicle.

2. In a device of the class described, a plate adapted to engage between the axle and sand-board of a vehicle and including a vertical web adapted to engage against the rear face of the sand-board, projections spaced apart and extending from said web and adapted to support a reach, another plate adapted to engage the running gear of a vehicle, means for connecting said first mentioned plate to one of said projections, and means adapted to connect said last mentioned plate to the running gear of a vehicle.

3. The combination with a vehicle including a forward axle forward hounds forward sand-board and forward bolster, of a lower member bearing between the axle and the sand-board and having rearward extensions, an upper member bearing upon the sand-board and provided with a rearward extension engaging the rearward extension of the lower bearing member, fastening devices connecting said extensions, an upwardly directed pin carried by said upper bearing member, and another bearing member connected to said bolster and having an aperture to receive said pin.

4. The combination with a vehicle including a forward axle forward hounds forward sand-board and forward bolster, of a lower plate bearing between the axle and the sand-board and having rearward extensions, an upper plate bearing upon the sand-board and provided with a rearward extension engaging the rearward extension of the lower plate, fastening devices extending through said engaging extensions, an upwardly directed pin carried by said upper plate, and a plate connected to said bolster and having an aperture to receive said pin.

In testimony whereof we affix our signatures in presence of two witnesses.

LEONIDAS W. GRAY. [L. S.]
GEORGE H. KNOWLES. [L. S.]

Witnesses:
J. A. LEARY,
C. W. WORTHINGTON.

---

Copies of this patent may be obtained for five cents each, by addressing the "Commissioner of Patents, Washington, D. C."